Dec. 17, 1929.   L. D. MORSE   1,739,558
HARVESTER ATTACHMENT
Filed Nov. 28, 1928   2 Sheets-Sheet 1

Inventor
Lyman D. Morse
By (signature)
Attorney

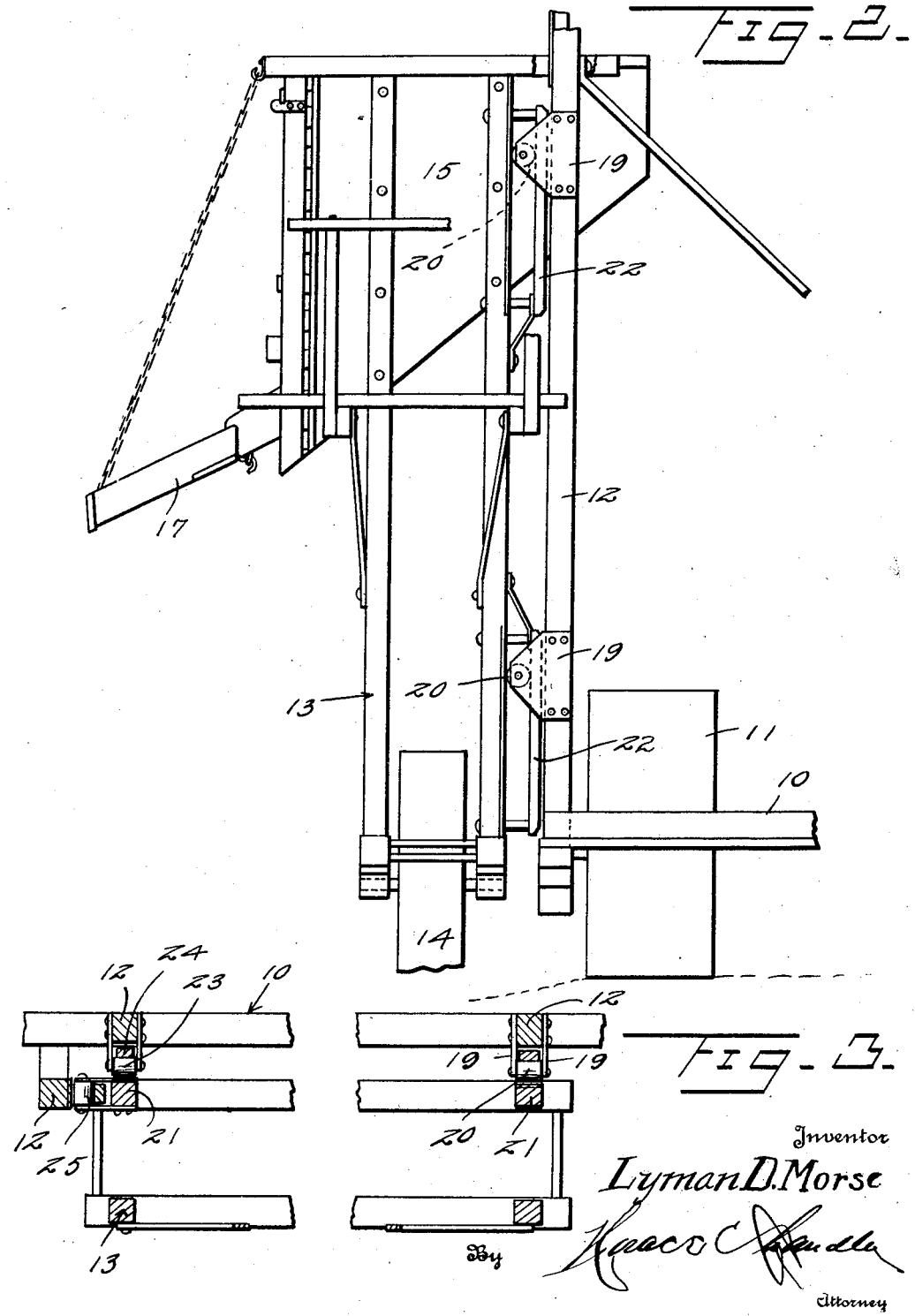

Patented Dec. 17, 1929

1,739,558

UNITED STATES PATENT OFFICE

LYMAN D. MORSE, OF BUTTE CITY, CALIFORNIA

HARVESTER ATTACHMENT

Application filed November 28, 1928. Serial No. 322,420.

This invention relates to new and useful improvements in grain harvesters.

One object of the invention is to provide an attachment for a grain harvester whereby the loose grain capacity is greatly increased.

Another object is to provide an attachment of the type mentioned, which will not interfere with the operation of the harvester, and which will not cause any strain on the machine.

A further object is to provide a receptacle attached to one side of the harvester, for receiving the loose grain, and which is so positioned that such grain may be easily and quickly dumped into a wagon driven into position therebelow.

A still further object of the invention is to provide a grain containing and receiving box, which is so attached to the side of the harvester that it will automatically adjust itself to the unevennesses of the ground, such box being supported on a ground wheel whereby to eliminate any strain or pull on the harvester frame.

Other objects and advantages will be apparent from the following description when taken in connection with the accompanying drawings.

In the drawings:

Figure 2 is a rear elevation of the same.

Figure 3 is a horizontal sectional view on the line 3—3 of Figure 1.

Figure 1:
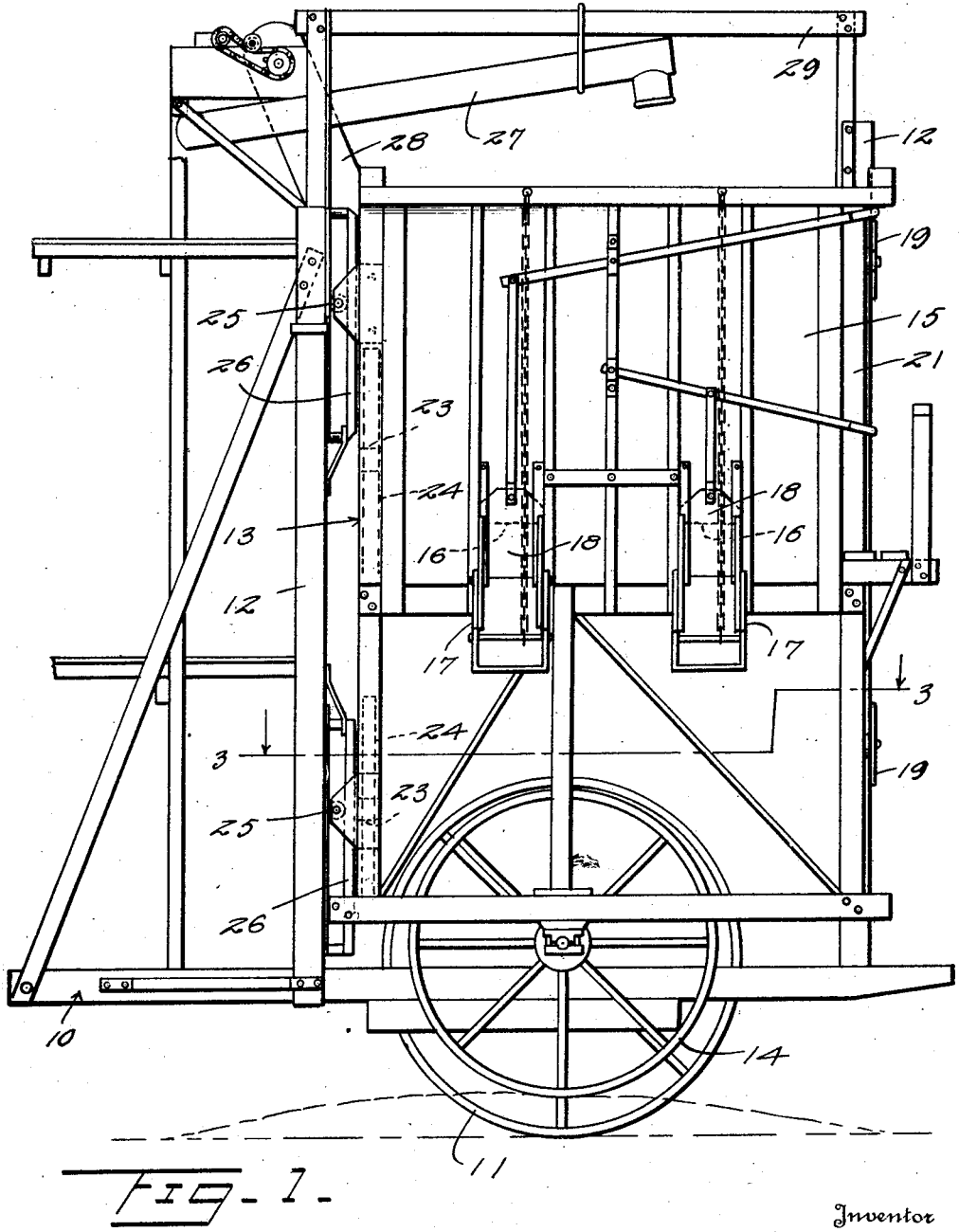
Figure 1 is a side elevation of the invention in applied position, only such portions of the harvester being shown as are immediately associated therewith.

Referring particularly to the accompanying drawings, 10 represents a portion of the frame of a harvester, which has the ground wheel 11 mounted therein. Erected on the said frame, at the side of the harvester, are the uprights 12, which extend above the harvester, as shown in the drawings. Disposed outwardly of these uprights is a vertical frame 13, and supported in the lower portion of such frame is a ground wheel 14. Mounted in the upper portion of the frame 13 is the grain box 15, the bottom of which inclines sharply downwardly and outwardly, away from the side of the harvester, the outer side of the box being provided with discharge openings for the grain, as shown at 16, such openings having the outwardly extending chutes 17, and being controlled by the vertically slidable doors 18. The deepest side of the bottom of the box is sufficiently elevated above the ground to permit a truck being driven under the chutes, to receive the grain from the box.

Mounted on the rear upright 12, and projecting outwardly therefrom, are the plates 19, and rotatably supported between said plates are rollers 20. Carried by the adjacent upright 21, of the frame 13, are the vertically disposed bars 22, such bars being spaced from the said upright 21, at the upper and lower portions thereof, and being straddled by the said plates 19, in such manner that the rollers 20 engage with the inner vertical faces of said bars, for the purpose of guiding the frame 13 in its vertical movements over inequalities in the ground. Similarly mounted on the forward upright 12 are the rollers 23, which engage with the bars 24 on the adjacent upright 21 of the frame 13. Also mounted on the front upright 21 are the rollers 25, which engage with the bars 26 carried by the front upright 12. The rollers and bars, or guides, between the frame 13, and the harvester, serve to properly guide the frame in its vertical movements as the ground wheel 14 rises and falls on the uneven portions of the ground, over which the harvester is being moved.

A screw conveyor 27 receives grain from the elevator 28, and such conveyor is supported on the frame 29, in position to deliver the grain into the center of the grain box.

The provision of this grain box, with its large capacity, provides for loading a truck with grain without the necessity of stopping the machine, such box having a capacity of approximately one hundred and fifty (150) bushels of grain, or sufficient to fill a truck.

What is claimed is:

1. An attachment for a combined harvester and thrasher comprising a grain receptacle, means loosely connecting the receptacle to the harvester for vertical slidable movement, and ground engaging means supporting the receptacle.

2. An attachment for a combined harvester and thrasher comprising a frame movably connected with the harvester for vertical slidable movement, a ground wheel supporting the frame, and a receptacle supported on said frame in position to receive grain from the thrasher and, means on the receptacle to deliver grain to a vehicle.

3. An attachment for a combined harvester and thrasher comprising a frame connected with the harvester for vertical slidable movement with respect thereto, a grain receptacle carried by the frame, and a ground wheel supporting the frame.

4. An attachment for a grain harvester comprising uprights carried by the harvester, guides on the uprights, a frame, a grain receptacle on the frame, rollers on the frame engaging the guides, and a ground wheel supporting the frame whereby said frame and receptacle are capable of vertical movement independently of the harvester.

In testimony whereof, I affix my signature.

LYMAN D. MORSE.